United States Patent [19]

Sol

[11] Patent Number: 5,269,458

[45] Date of Patent: Dec. 14, 1993

[54] FURNACE MONITORING AND THERMOSTAT CYCLING SYSTEM FOR RECREATIONAL VEHICLES AND MARINE VESSELS

[76] Inventor: David Sol, 26500 W. Agoura Rd. Ste 383, Calabasas, Calif. 91302

[21] Appl. No.: 4,268

[22] Filed: Jan. 14, 1993

[51] Int. Cl.$^5$ .................... G05D 23/00; F23N 5/00
[52] U.S. Cl. ........................................ 236/11; 236/94; 431/27
[58] Field of Search ................ 236/11, 94; 431/27

[56] References Cited

U.S. PATENT DOCUMENTS

4,951,870 8/1990 Ballard et al. ................... 236/11
4,978,292 12/1990 Donnelly et al. ................ 236/11 X

*Primary Examiner*—William E. Wayner

[57] ABSTRACT

Recreational vehicles and marine vessels provide for cabin environment heating by a thermostatically controlled furnace which is typically fueled by a portable supply of liquefied petroleum gas and electrically powered by an on board battery. The invention detects and corrects for the situation where the furnace does not light by cycling the thermostat to allow the furnace to relight. The device will allow for three trials before the thermostat is locked out in an off position to prevent the furnace from blowing cold air and draining the battery system. The device provides for centrally located indication of the current temperature and a resettable display of the furnace retrial and lockout condition status, as well as the gas pressure as delivered to the furnace.

8 Claims, 6 Drawing Sheets

FURNACE MONITORING AND THERMOSTAT CYCLING SYSTEM FOR RECREATIONAL VEHICLES AND MARINE VESSELS

BACKGROUND OF THE INVENTION

I. Field of the Invention

The present invention relates generally to a device for use in mobile recreational vehicles, marine vessels, and other such mobile self-contained living environments. The device monitors ga furnace heater operation and cabin environment temperature and if the furnace fails to light automatically cycles the thermostat to retry for furnace ignition.

II. Description of the Prior Art

Typically mobile recreational vehicles (RV's), houseboats, marine vessels, and other such mobile self-contained environments provide for cabin environment heating by a thermostatically controlled furnace which is typically fueled by combusting a portable supply of liquefied petroleum gas (LPG), also known as propane. The furnace is typically powered by an on board battery for electrical demands such as blower or fan operation, opening and closing burner valves, and spark ignition functions. As is known in the art a thermostat mounted in the RV or the like acts like a thermal switch, closing when sensing the ambient temperature has fallen below a desired setpoint temperature. The furnace senses the closed switch through the electrical connections and turns on to provide heat and raise the temperature.

It is known in the art that the battery systems of RV's and the like are typically used for long periods of time, often when an external source of electricity such as from an RV park or dockside are not available. The voltage available from the battery to operate the various appliances may be much lower than that when fully charged. It is also known in the art that the commercially available gas powered furnaces are prone to ignition failure when available voltage is low. Other common scenarios which lead to ignition failure are extremes of cold and/or humidity, and moisture or air in the propane tank or delivery system.

Another common problem relating to the ignition failures of typical RV furnaces also relates to the propane system. The liquified petroleum gas is stored in a liquid form under relatively high pressure in the LPG supply tank. Gas pressure regulators are normally installed at or near the propane tank and regulate the gas pressure in the lines, providing the propane gas at their outlets at a relatively low pressure. The gas pressure regulators often fail to regulate the pressure in the lines within the range suitable for ignition at the furnace. Further, even with a good pressure regulator the gas pressure delivered to the furnace may be low due to excessive flow to other propane fueled appliances simultaneously demanding flow of propane. For example, occupant cooking, water heater turn-on, and absorption refrigerator burner turn-on may all occur simultaneously, increasing the propane gas flow demand and possibly causing a low propane gas pressure to exist downstream of the pressure regulator. In this situation, a low gas pressure supplied to the heating furnace may lead to ignition failure, as well as inoperability of other propane fueled appliances in the RV.

Occupants of the RV have no way of knowing which of these scenarios may be the most significant factor in gas furnace ignition failure.

Normally when such conditions exist and the furnace fails to ignite, the safety functions of the furnace shut off the flow of fuel. However, with most furnaces commercially available and installed in the RV environment the fan or blower motor will continue to operate. Often the occupant will note the ignition failure by the lack of warm air, and cycle or reset the thermostat by shutting it off and turning it back on again, typically after a short delay. The delay allows for the furnace to totally shut down as the blower motor typically continues for a few minutes as a safety feature after the thermostat is off to ensure the combustion chamber is clear of gas. Often after a simple such reset or possibly two the furnace will ignite, due to possible purging of air in the lines through the furnace, or the existence of marginal operating conditions.

As is known in the art, failure of the furnace to ignite has several negative implications if not detected. The furnace blower will continue to run, albeit blowing cold air instead of warm air. Also, it is known that although typical furnaces in RV's and the like draw very little standby current (typically a fraction of an ampere) when not running, a running furnace will draw a relatively large current for blower or fan motor operation. Since the blower is blowing cold air, the ambient temperature inside the RV will not rise as intended but instead actually fall increasingly rapidly since colder outside air is being drawn into the interior and distributed through the ducting system of the RV. Since the ambient temperature inside the RV is not being raised to the desired thermostat setpoint temperature, and in fact moving farther below it, the furnace blower will continue to run indefinitely. Worse, if unattended, the on board battery system will continue to be drained constantly at a very significant rate until completely dead and no appliances can be used. A common scenario for such failures is for the RV occupants to wake up very late in the night or early in the morning in a very cold environment to find the furnace blowing cold air. Often the battery has then been depleted to the point where it cannot supply sufficient voltage for furnace ignition. Another common scenario, particularly in cold climates where the demand for propane by the furnace and water heater appliances is intermittent but relatively high is for an otherwise functional system to become nonfunctional due to the depletion of fuel in the propane tank at some point in the night or during an unattended interval.

There is a need in the art for a system which detects the failure of a typical RV furnace to ignite and cycles or resets the thermostat until ignition occurs, thereby preventing the blowing of cold air and battery depletion. Such a novel device would provide autonomous operation, emulating the presence and attention of the RV occupant whenever the thermostat closes and calls for the furnace to provide heat.

There is a further need in the art for further such autonomous operation such that when the propane tank is emptied of fuel at some point during the cycles of furnace operation the thermostat would be turned off or disabled. Such a novel device would emulate the accurate conclusion of the RV occupant that further repeated attempts at relighting the furnace would be fruitless and counterproductive.

There is a further need in the art for a device providing further such autonomous operation such that the occurrence of any such condition above and beyond emptying of the propane tank which prevents ignition of the furnace would similarly emulate the accurate conclusion of the RV occupant that further repeated attempts at relighting the furnace would be fruitless and counterproductive.

The prior art does not provide for any such system.

There is a further need in the art for such a system which also provides for monitoring of the propane gas pressure delivered to the appliances in the RV to assist in determining the cause for furnace ignition failures. Further, there is a need in the art to provide an indication to the RV occupants when the gas pressure falls below the minimum allowable pressure for appliance operation. Similarly, there is a need in the art for a system which indicates pressures higher than the maximum allowable for appliance operation.

The prior art does not provide for any such system.

Various examples of the prior art exist for thermostat design, but these are not central to the present invention nor its autonomous operation which only interfaces with such various devices as thermostats in an RV and is not concerned with the internal operation or detailed design of same. For example U.S. Pat. No. 3,621,434 of Gerich provides for a detailed mechanism internal to the workings of a trip-free manual reset thermostat but does not address the need in the art discussed herein.

U.S. Pat. No. 4,188,604 of Maybee provides for a regulator for thermostats which at preselected times changes the temperature at which heat is called for by the thermostat. The device and all other similar devices such as electronic implementations commercially available in the recent art do not meet the need in the art to provide autonomous thermostat cycling or resetting features of the nature required to anticipate and correct for furnace ignition failure.

U.S. Pat. No. 3,861,589 of Carlson provides for an electronic thermostat accepting either AC or DC current and provides for a clean circuit opening when the applied circuit voltage is low. These are advantageous in the case of controlling the winding of a solenoid valve to supply gas to a furnace, but does not meet the need in the art for autonomous detection of RV furnace ignition failure due to gas depletion or low voltage or marginal operating conditions.

U.S. Pat. No. 4,338,891 of Blitz controls the temperature in automotive storage compartments integral with the fluid cooled internal transport system of the internal combustion engine of the self-powered vehicle by circulating engine coolant fluid through a heat exchanger. Thus it does not meet the need in the art to address the ignition shortcomings of a gas furnace heating unit controlled by a thermostat in an RV or similar environment, the heating systems of which are independent from the transport engine, if one even exists in the RV (such as for example would not be the case with a towable trailer).

U.S. Pat. No. 4,420,033 of Franz controls the temperature in vehicle passenger compartments through a vacuum operated servoactuator which cycles the cooling refrigerant compressor and modulates the heater core water valve of the vehicle. Thus it also does not meet the need in the art to address the ignition shortcomings of a gas furnace heating unit controlled by a thermostat in an RV or similar environment, the heating systems of which are independent from the cooling refrigerant compressor driven by the transport engine, if one even exists in the RV.

U.S. Pat. No 4,416,324 of Sutch et al, which also controls the temperature in vehicle passenger compartments, regulates a blower speed and air door opening. Thus it also does not meet the need in the art to address the ignition shortcomings of a gas furnace heating unit controlled by a thermostat in an RV or similar environment.

U.S. Pat No. 4,750,671 of Heinle et al provides a regulating device for a heating system of a motor vehicle by regulating air flow so as to balance the air temperatures of driver and passenger sides through throttle valve regulation and so does not meet the need in the art to address the ignition shortcomings of a gas furnace heating unit controlled by a thermostat in an RV or similar environment.

U.S. Pat. No. 4,543,795 of Ward et al provides for regulating the temperature within the cabin of a vehicle such as a truck tractor or an agricultural vehicle with a power circuit which applies electrical power to a heating/cooling device and so does not meet the need in the art to address the ignition shortcomings of a gas furnace heating unit controlled by a thermostat in an RV or similar environment.

U.S. Pat. No. 4,514,976 of Christoff relates to environmental control units for aircraft and the like through an improved integration with the compressor turbomachinery of such vehicles as large passenger planes and so does not meet the need in the art to address the ignition shortcomings of a gas furnace heating unit controlled by a thermostat in an RV or similar environment, the heating systems of which are independent from turbomachinery, which do not exist in an RV.

U.S. Pat. No. 4,308,993 of Buss is also a heating system for aircraft cabins which uses engine bleed air or compressor air for heating the passenger space and so similarly does not meet the need in the art to address the ignition shortcomings of a gas furnace heating unit controlled by a thermostat in an RV or similar environment.

U.S. Pat. Nos. 3,711,044 of Matulich, 3,825,212 of Darges et al, and 3,861,624 of Lear all deal with various such mechanisms for aircraft cabin environment temperature and so similarly do not meet the need in the art to address the ignition shortcomings of a gas furnace heating unit controlled by a thermostat in an RV or similar environment.

U.S. Pat. No. 4,784,214 of Penson et al relates to a secondary remote control system for an RV's air conditioning unit, typically roof mounted and possibly including an auxiliary heating unit. The auxiliary heating unit is a resistive electrical strip and so does not meet the need in the art to address the ignition shortcomings of a gas furnace heating unit controlled by a thermostat in an RV or similar environment.

Although the prior art provides for displaying the level of propane in the supply tank as it exists stored under high pressure in its liquid form, the art does not provide for monitoring the gas pressure in an RV as delivered to the furnace and other appliances, downstream of the pressure regulator. Commercially available dial gages are available and can be utilized for diagnostic purposes on the propane system of an RV, but being a portable tool by nature are designed only for temporary use and can only be read locally at the point of mechanical connection. Nor does the prior art provide for the indication or alarm of too low or too high a gas pressure being supplied to the propane fueled furnace or other appliances of an RV.

It is apparent then that the prior art does not satisfy the need for a system which detects the failure of a typical RV furnace to ignite and cycles or resets the thermostat until ignition occurs, thereby preventing the blowing of cold air and battery depletion. Nor does the prior art satisfy the need for autonomous operation such that when the propane tank is depleted or conditions arise which cause repeated attempts to ignite the furnace to fail the relighting attempts are recognized as fruitless and counterproductive and the thermostat is autonomously disabled. Nor does the prior art satisfy the need for a permanently installed remote monitoring and alarming capability in an RV of the gas pressure as delivered to the furnace to assist in determination of the cause of ignition failure.

SUMMARY OF THE INVENTION

The present invention meets these needs by, along with other functions, monitoring the ambient temperature in the cabin of an RV or marine vessel or the like. The device provides for displaying this temperature at centrally located panel in the cabin. The temperature signal is converted to digital form and a temperature gradient with respect to time is computed. If the gradient is negative, then the ambient temperature is decreasing. Concurrently the device monitors the current drawn by the furnace and senses from the current drawn if the blower motor is on. If the blower motor is sensed on and the ambient temperature is computed to be decreasing three successive times then it is determined the furnace is not heating the cabin space due to ignition failure. The device then performs a cycling action on the thermostat. The electrical connections of the thermostat to the furnace are broken so as to present an open switch to the furnace, initiating furnace shut-down. After a delay sufficient for the safety delay inherent in the furnace shutdowns, the electrical connections of the thermostat to the furnace are then closed so as to present a closed switch to the furnace, initiating turn-on and a retrial of the furnace. The temperature monitoring and fan or blower sensing resume as before should the attempt have been unsuccessful or the furnace later fail to ignite, or later fail to function due to fuel depletion or other condition. The device will perform a maximum of three cycle attempts since a user reset, and then disable the thermostat in a lock-out condition.

Indication is provided at the centrally located panel for the current cycle and lockout status so the occupant can determine how many ignition failures occurred. Provision to reset the device is also provided at the central panel.

Also displayed at the centrally located panel is the gas pressure as delivered to the gas furnace, enabling the occupant to immediately determine if the ignition failures were due to low, high or marginal gas pressure, or depletion of the gas supply as would be indicated by zero pressure. When the gas pressure falls below the recommended minimum gas pressure, an alarm indicator also preferably located at the central panel is energized. A second alarm indicator can be energized when the gas pressure rises above the recommended maximum.

BRIEF DESCRIPTION OF THE DRAWINGS

FIG. 1 is a diagram showing the invention and its electrical connections to the heating components of a recreational vehicle or the like.

DESCRIPTION OF THE PREFERRED EMBODIMENT

Figure 1:
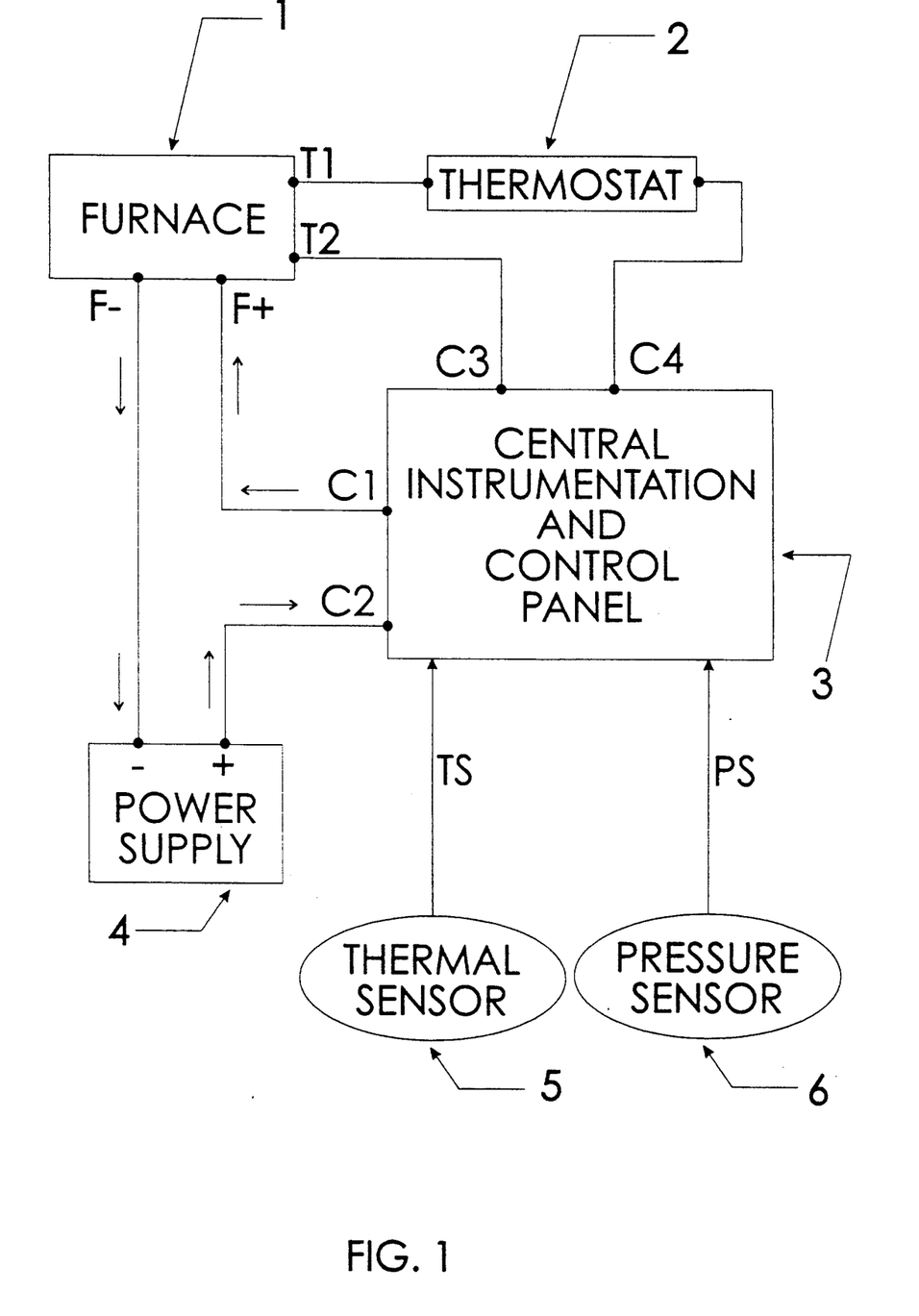

Referring first to FIG. 1, the preferred embodiment of the invention is shown electrically connected to the typical heating components of a recreational vehicle or marine vessel or the like. The details of the internal operation of the furnace and its components is not central to the invention and as such the furnace will not be described beyond characterization of its interface to the invention. What will be described first is the manner in which the electrical connections of the invention, the Central Instrumentation and Control Panel 3 of FIG. 1, are made so as to present the invention in series between the power supply or battery and the furnace and simultaneously in series between the furnace and thermostat.

The electrical connections of the power supply or battery are now described. Still referring to FIG. 1 the battery or battery system is represented by Power Supply 4. The furnace 1 is normally electrically powered by direct connection to the power supply, with the electrical contact F− of the furnace connected directly to the negative terminal of the power supply, as shown in FIG. 1. The electrical contact F+ of the furnace which is normally connected to the positive terminal of the power supply is instead, in the preferred embodiment of the invention, connected to the electrical contact C1 of said central instrumentation and control panel 3 in the figure. The positive terminal of the power supply 4 is then connected to the electrical contact C2 of the invention as shown in the figure. In this manner the current which normally flows from power supply 4 to the furnace 1 passes through the preferred embodiment of the invention. In this way, flow of current to the furnace can be sensed by the invention, the details of which will be described later.

Still referring to FIG. 1, the electrical connections of the thermostat 2 are now described. The thermostat presents an open circuit of infinite resistance when the cabin environment temperature of the recreational vehicle is greater than the demanded temperature setting of the thermostat, or a closed circuit of zero resistance when the cabin environment temperature is less than the demanded temperature setting of the thermostat. In this manner, the thermostat signals to the furnace or calls for heat by presenting an open or short circuit. The thermostat 2, which is normally connected across the electrical contacts T1 and T2 of the furnace 1, is instead in the preferred embodiment of the invention connected in series with said central panel 3 by connecting one end of the thermostat 2 to electrical contact T1 of the furnace and the other to electrical contact C4 of the central panel. Electrical contact C3 of the central panel is connected to the contact T2 of the furnace 1. In this way, a short circuit presented to the furnace by the thermostat can be opened or interrupted, the details of which will be described later, thereby turning off the furnace.

Still referring to FIG. 1, the thermal sensor 5 of the preferred embodiment of the invention provides an analog voltage first signal TS indicative of vehicle cabin temperature to the central panel. In another embodiment of the invention a temperature transmitter can be used which provides a small current, typically 4 to 20 milliamperes in many commercially available transmitters. A shunt resistor could then be suitably employed to provide an analog voltage signal indicative of the vehicle cabin temperature. In yet another embodiment of the invention, a commercially available IC (integrated circuit) could be suitably employed to provide a digital signal indicative of the cabin temperature. These and other possible variations implementing the functionality described herein are properly considered to be within the scope and spirit of the claims to be presented.

Still referring to FIG. 1, the pressure sensor 6 of the preferred embodiment of the invention provides an analog voltage signal PS indicative of the propane gas pressure as delivered to the gas furnace of the RV. Details of the pressure sensor and the propane supply system will be described later. The signal PS is displayed at the centrally located panel to provide remote indication and diagnostic capability. When the signal falls below a setpoint, an alarm is energized to provide indication to the RV occupants of low propane gas pressure. A second setpoint can also be used such that when the signal rises above it, a second alarm is energized providing indication of high gas pressure. In another embodiment of the invention a pressure transmitter can be used which provides a small current, typically 4 to 20 milliamperes in many commercially available transmitters. A shunt resistor could then be suitably employed to provide an analog voltage signal indicative of the propane gas pressure. Alarm setpoint operations are included in such commercially available transmitters, as well as various indication meters in the art. In yet another embodiment of the invention, a commercially available analog to digital (A/D) IC (integrated circuit) could be suitably employed to provide a digital signal indicative of the pressure with appropiate signal processing and energizing of comparators or commercially available Schmitt trigger devices to implement the alarm setpoint operations. These and other possible variations implementing the functionality described herein are properly considered to be within the scope and spirit of the claims to be presented.

Figure 2:
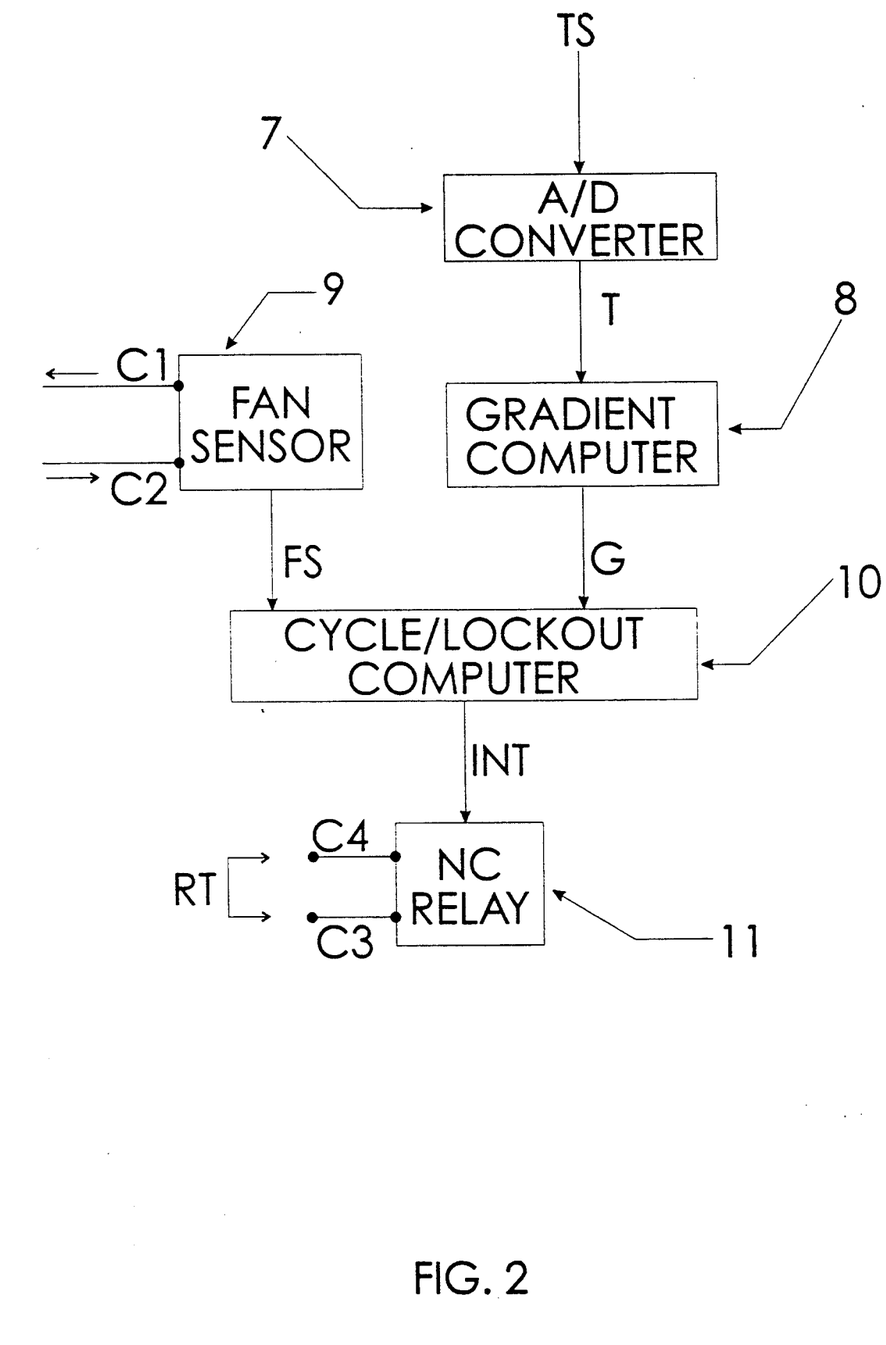
FIG. 2 is a block diagram of the invention shown in FIG. 1.

Referring now to FIG. 2, the general operation of the invention with regard to temperature monitoring and thermostat cycling will be described. In the preferred embodiment the analog signal TS from the temperature sensor previously described is applied to an analog to digital (A/D) converter 7 to produce the digital signal T indicative of temperature. The signal T is then input to the Gradient Computer 8 which computes a second signal, the thermal gradient with respect to time, the details of which are described later. If the temperature is decreasing over time, the gradient third signal G is output ON or high from the gradient computer and applied to the Cycle/Lockout Computer 10. The Fan Sensor 9 detects the operation of the fan or blower motor in the furnace from the current being drawn by the furnace through terminals C2 and C1, and outputs the fan sensor fourth signal FS high or ON if fan operation is detected, the details of which are described later.

The fan sensor signal FS as well as the gradient signal GS are both input to said Cycle/Lockout Computer 10. If the gradient signal G and the fan sensor signal FS are both high, indicating the furnace fan is on yet the temperature is decreasing, the cycle/lockout computer performs actions to correct the probable scenario that the furnace has failed to ignite and is blowing cold air. If the corrective actions have not been effective three times since a reset then the assumption is made the furnace will not fire due to lack of fuel or low voltage from the battery or some other malfunction and will lock out the furnace from attempting to ignite again, the details of which are to be described later. If the recycle/lockout computer determines the furnace has not ignited and is blowing cold air, it outputs the pulsed interrupt signal INT which is applied to the coil of normally closed (NC) relay 11. When the signal INT is low or OFF the normally closed relay presents a short circuit to the electrical contacts C3 and C4 such that the resistance RT shown in the figure is zero. On the other hand, when the interrupt signal INT is high or ON, the coil of said NC relay is opened, presenting an open circuit between the contacts C4 and C5 such that the resistance RT shown in the figure is infinite. In this manner the cycle/lockout computer can cycle the furnace if the thermostat is on (i.e., calling for heat) by opening and reclosing the circuit by pulsing the interrupt signal INT. If the furnace fails to ignite after three such cycling actions, it can be turned off or locked out by the cycle/lockout computer by setting the interrupt signal INT high or ON. Details of the cycle/lockout computer will be described later.

Figure 3:
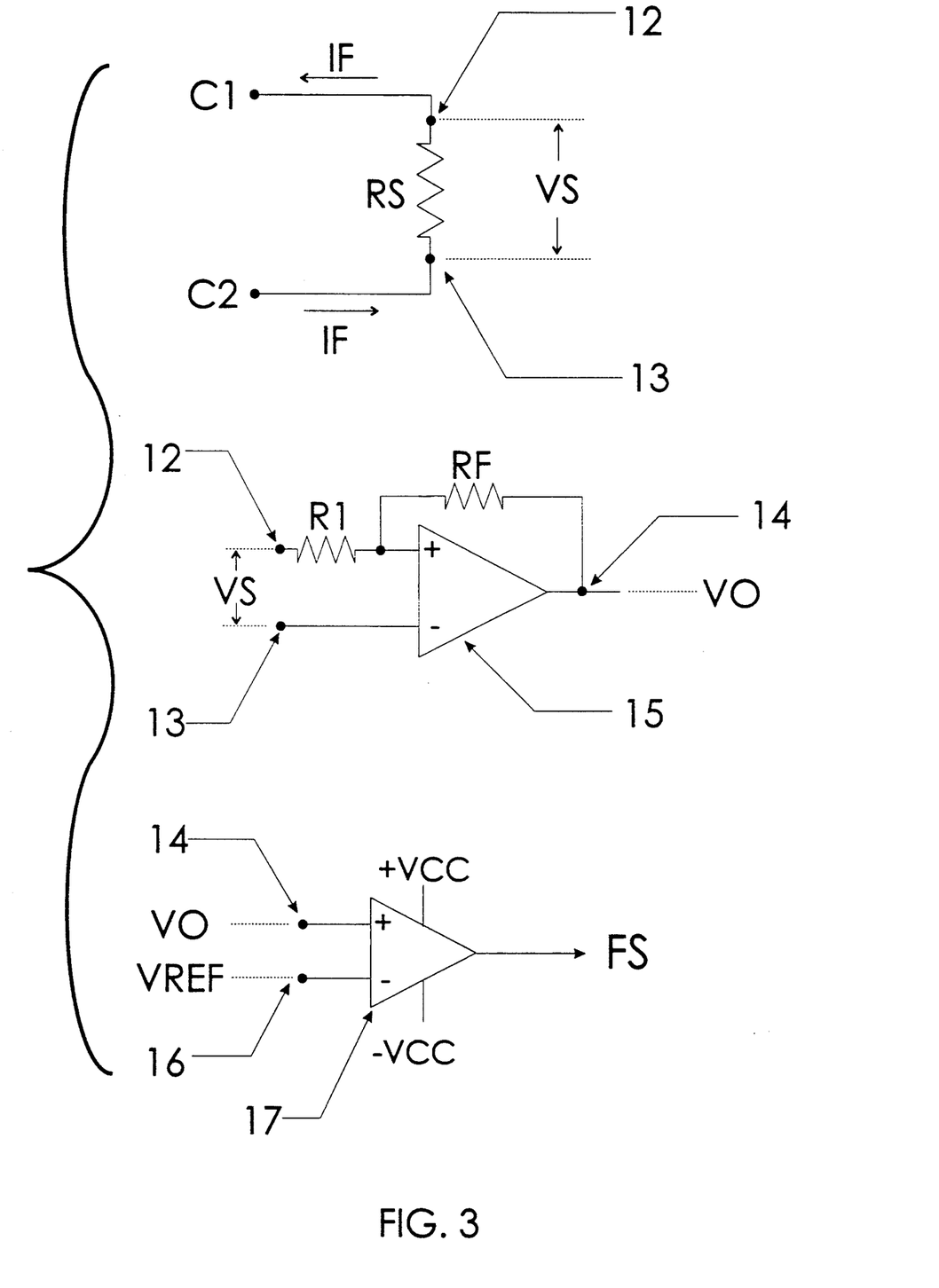
FIG. 3 is a segmented circuit diagram of the Fan Sensor shown in FIG. 2.

Referring now to FIG. 3, the fan sensor referenced previously in prior FIG. 2 will be described. The current drawn by the furnace when in operation and powered by vehicle voltages of twelve volts is typically about five to ten amperes, most of the current being supplied to the fan or blower of the furnace. The method of sensing this fan current will now be described. In the preferred embodiment of the invention, the current to be sensed, fan current IF flows from terminal C2 to terminal C1 in the figure. The current flows through sense resistor RS, producing a sensed voltage drop VS across it. The sensed voltage VS due to furnace current is then applied to a buffer amplifier formed by operational amplifier 15 with input resistor R1 connected to its non-inverting input and feedback resistor RF connected from the output at node 14 to its non-inverting input as shown in the figure. Power supply connections are understood and not shown. The sensed voltage VS is then applied across nodes 12 and 13, producing an output voltage VO at the output node 14. If no current is drawn by the furnace, the sense voltage VS is zero and the output voltage VO of said operational amplifier 15 will then be equal to the cabin power supply voltage supplied to the furnace at C2, normally twelve volts. On the other hand, if current is being drawn by the furnace, the output VO will be equal to the cabin power supply voltage plus the sense voltage multiplied by the gain of the amplifier stage which in the preferred embodiment here is RF/R1. This output voltage is applied to the non-inverting input at node 14 of comparator 17, and a reference voltage VREF is applied to the inverting input at node 16 of the comparator. The reference voltage VREF may be preferably set to the cabin power supply voltage supplied to the furnace at C2. When the furnace current is drawn and sense voltage VS becomes non zero, the voltage VO will become greater than the reference voltage VREF by the amount (RF/R1)*VS. The comparator output, signal FS will then swing to the positive supply voltage +VCC, which is preferably a digital logic level in the preferred embodiment. In this manner, the digital fan sensor signal FS is output high when the furnace fan is on and drawing current. Other similar means of detecting the current draw may be employed, such as utilizing transistors or Darlington transistor pairs instead of operational amplifiers, employing commercially available integrated circuit Schmitt triggers instead of comparators, or augmenting the circuit described here in the preferred embodiment with hysteresis feedback paths and such. Various other methods of sensing current alternative to the preferred embodiment will no doubt occur to those skilled in the art, for example utilizing a commercially available current sensor known as a Hall sensor which is responsive to the magnetic field associated with current flow. These and other possible variations implementing the functionality described herein are properly considered to be within the scope and spirit of the claims to be presented.

Figure 4:
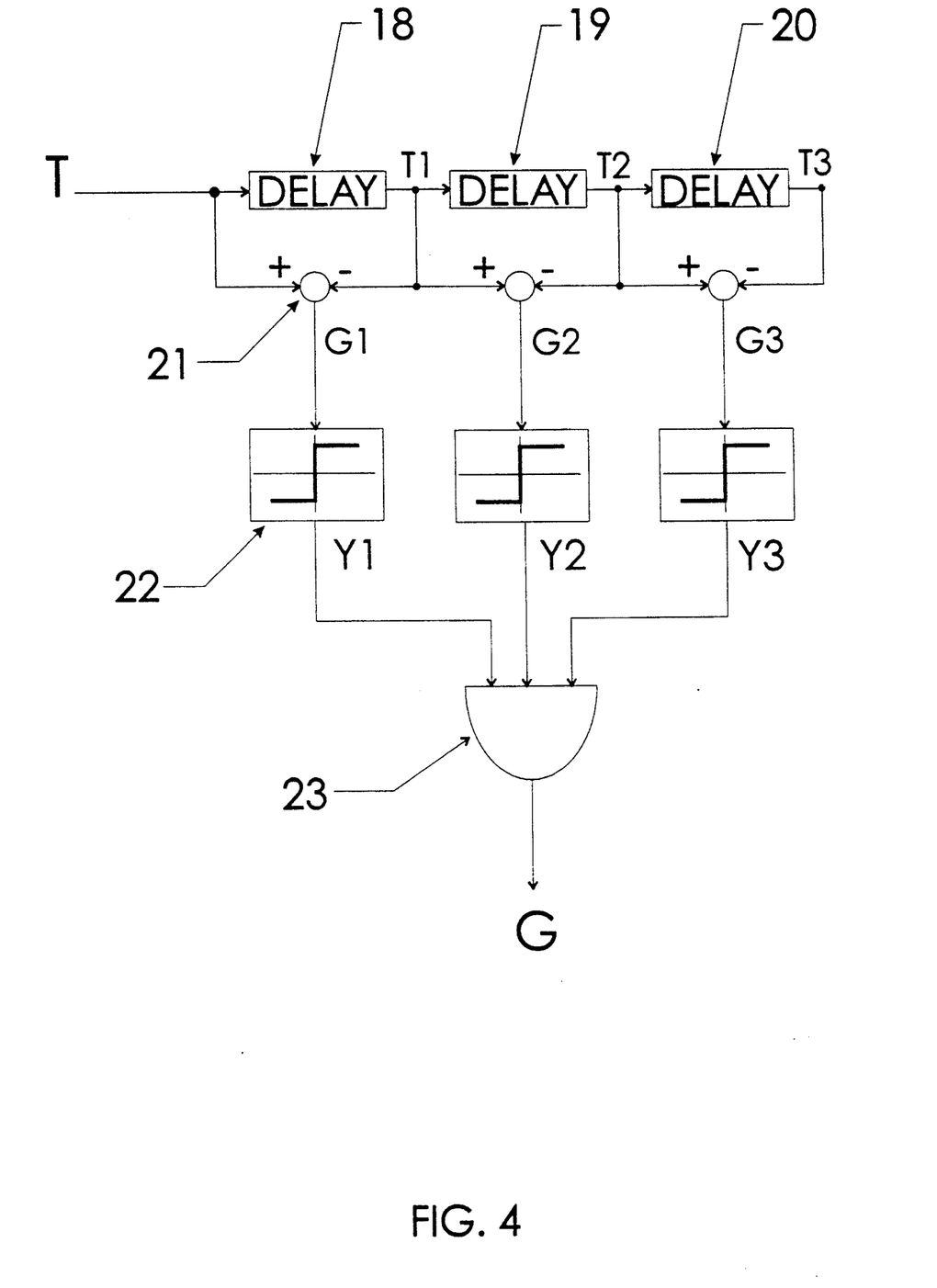
FIG. 4 is a block diagram of the Gradient Computer shown in FIG. 2.

Referring now to FIG. 4, the gradient computer referenced previously in FIG. 2 will be described. The digital signal T, previously described as the output from the analog to digital converter of prior FIG. 2 is used to detect a decrease in the vehicle's cabin environment temperature in the embodiment by digital logic. As described in flowchart form, the signal T is delayed by delay block 18 and stored in a buffer register as signal T1. Similarly, the signal T1 is delayed by delay block 19 and the result stored in a buffer register as the twice delayed signal T2, and the signal T2 is delayed by delay block 20 and the result stored in a buffer register as the thrice delayed signal T3. In the preferred embodiment, the signal T and the delayed signal T1 are input to a subtractor 21 so as to form the differential signal G1 such that the value of G1 is equal to the value of T minus the value of T1, making the value of G1 positive if the temperature signal is decreasing over time in decrements at least as large as the least significant bit (LSB) of the A/D converter. Similarly the differential signal G2 is formed by the subtraction of T2 from T1 and the differential signal G3 is formed by the subtraction of T3 from T2. In the preferred embodiment, the differential signals G1, G2, and G3 are each fed to a block 5 to produce signals Y1, Y2, and Y3, respectively, where the functionality of the block is represented by the signum function, i.e., Y=sgn(G). This provides a digital one or high at the output Y if the input G is positive and a digital zero or low if the input G is negative. The outputs Y1, Y2, and Y3 are therefore set one or high if the temperature differential signals G1, G2, and G3 are positive which indicates a decreasing temperature, indicative of the cabin environment becoming colder. In other embodiments of the invention the carry bit from the prior subtraction could be output directly or passed through a buffer or flip-flop, or the temperature signals fed to the inverting and non-inverting inputs of a comparator to produce the appropriate signals at the comparator outputs. Likewise, in other embodiments of the invention, various arrangements of J-K, R-S, and other flip-flops can be utilized to produce the signals Y1, Y2, and Y3. These and other possible variations implementing the functionality described herein are properly considered to be within the scope and spirit of the claims to be presented. The signals Y1, Y2, and Y3 are all input to AND gate 23 to produce the output signal G which will energized to high when a decrease in temperature is detected. The gradient signal G thus requires three successive decreases in temperature to indicate a negative thermal gradient, so as to average out spurious noise effects in the measurement of the temperature signal.

Figure 5:
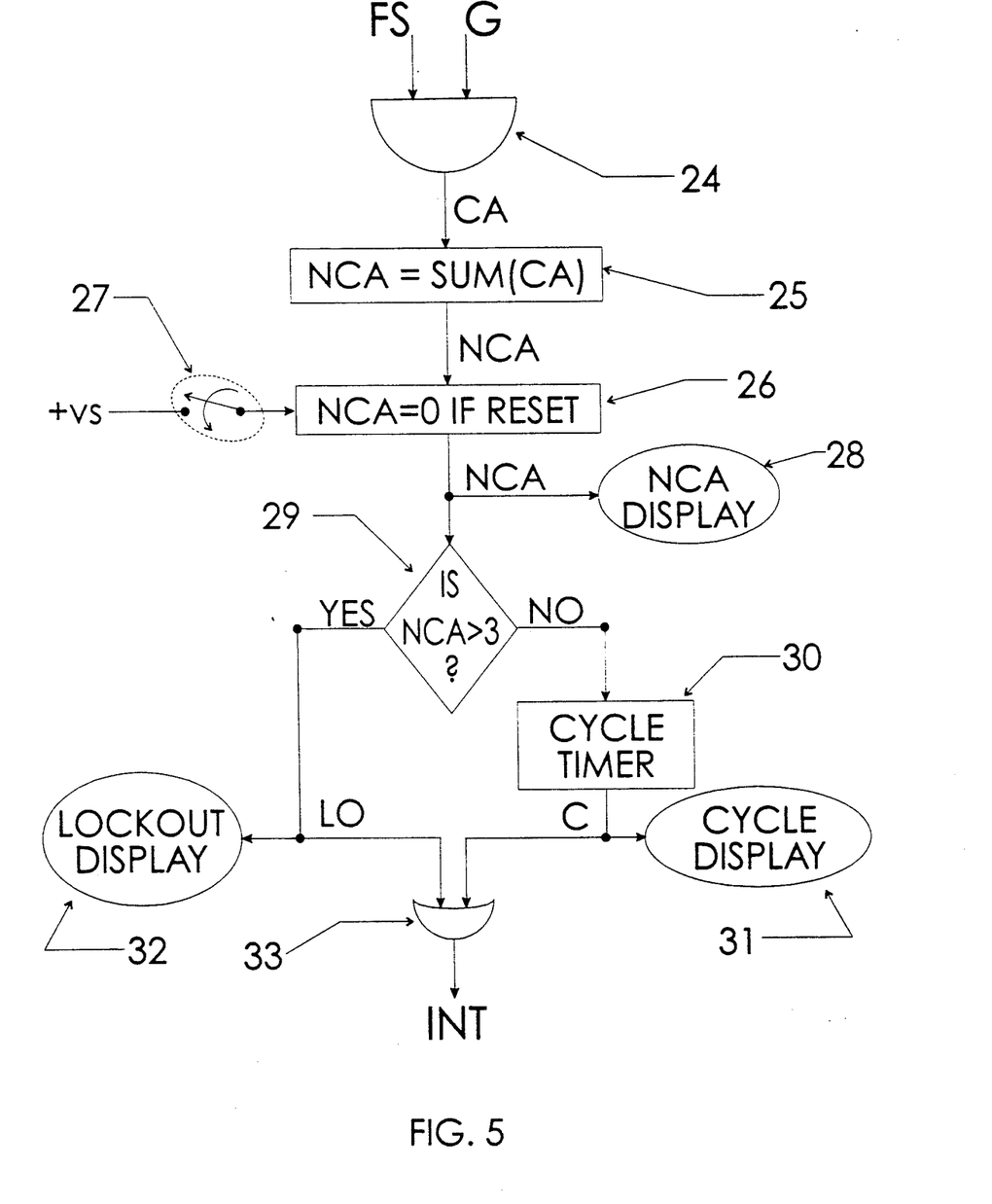
FIG. 5 is a block diagram of the Cycle/Lockout computer shown in FIG. 2.

Referring now to FIG. 5, the recycle/lockout computer previously referenced in prior FIG. 2 will be described. The fan sensor signal FS and the gradient signal G are both input to the AND gate 24 which produces the output logic fifth signal CA. If the gradient signal G and the fan sensor signal FS are both high or ON, indicating the furnace fan is on yet the temperature is decreasing meaning that the furnace has failed to ignite and is blowing cold air, said AND gate 24 outputs the corrective action signal CA high or ON. The signal CA is applied to counter block 25 to increment the counter signal NCA representing the number of times corrective action has been necessary. Counter signal NCA is resettable to zero as shown by block 26. In the preferred embodiment, momentary switch 27, preferably located on the central control panel of the preferred embodiment, resets counter signal NCA by setting a clear line of the counter logically high to the appropriate logic level voltage supply +VS. The counter signal NCA is applied to NCA display array 28 which is preferably an array of three indicators such as light emitting diodes (LEDs), thereby informing the user how many times corrective action was required. The counter signal NCA is also applied to decision block 29. If counter signal NCA is not greater than three, the cycle timer 30 is turned on which provides at its output a pulsed cycle signal C which goes high or ON for a preset length of time before returning to low or OFF. Said cycle signal C is also applied to the cycle display 31, preferably an LED, providing indication of the cycling action in progress. Returning to decision block 29, if the counter signal NCA is greater than three, meaning corrective actions have not been effective three times since a reset then the assumption is made the furnace will not fire due to lack of fuel or low voltage from the battery or some other malfunction and it is blowing cold air. The lockout sixth signal LO is set high or ON and applied to the lockout display 32, preferably an LED, providing indication of such lockout condition. The lockout signal LO is applied to the input of OR gate 33, along with the cycle signal C. The output of said OR gate, interrupt signal INT, is high or ON when either lockout signal LO is ON or cycle signal C is ON. As previously described, the interrupt signal INT effectively turns the furnace off when it is high, and therefore the furnace—thermostat circuit is subject to the corrective action when necessary of being cycled off and then on by the pulsed cycle signal C or ultimately being turned off by lockout signal LO.

Figure 6:
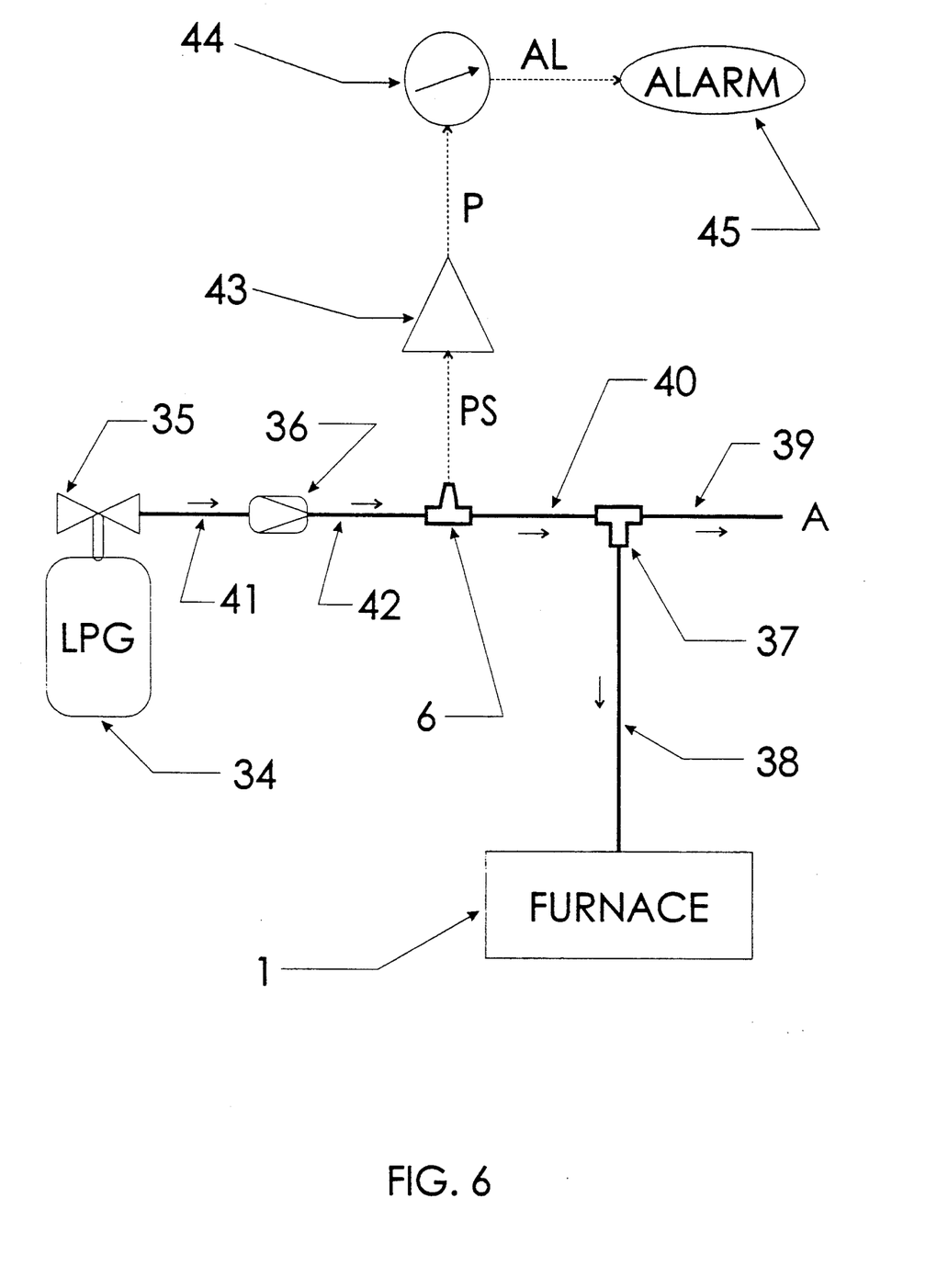
FIG. 6 is a diagram showing a typical RV propane supply system and its interface with the pressure sensor, furnace, and central panel shown in FIG. 1.

Referring now to FIG. 6, the monitoring and alarm of propane gas pressure delivered to the furnace in a typical RV propane supply system will be described. An LPG supply tank 34 stores the LPG in a liquid form under high pressure. A valve 35, often referred to in the art as a POL valve, is installed in the tank to allow shutoff of the LPG flow. Details of safety valves, overfill valves and other such normally installed devices are not central to the operation described herein and are therefore not shown in the figure. A pressure regulator 36 is typically installed at or near the supply tank an is in pneumatic communication with the outlet of said valve 35 by fittings or line 41. Said regulator provides at its outlet propane gas at a relatively low pressure and is in pneumatic communication with one end of supply line 42, normally copper tubing. The other end of supply line 42 is in pneumatic communication with one port of pressure sensor 6, previously shown in prior FIG. 1 with regard to electrical signal communication. The other port of said pressure sensor is in pneumatic communication with supply line 40 such that propane gas flows from the pressure regulator through the pressure sensor to Tee-fitting 37. In the preferred embodiment, a second port of said Tee-fitting is in pneumatic communication with supply line 38 and allows propane gas flow to the Furnace 1, previously shown in prior FIG. 1 with regard to electrical signal communication. A third port of said Tee-fitting is in pneumatic communication with supply line 39 and allows propane gas flow to all other RV propane fueled appliances, not shown but understood to be downstream of port A in the figure. Other details and variations of RV propane installations not central to the invention and its preferred embodiment are not shown. As previously described in FIG. 1, the pressure sensor 6 provides the electrical signal PS responsive to the propane pressure to the central panel. The signal PS is input to instrumentation amplifier 43 which outputs the signal P conditioned to drive display meter 44, providing visual indication of the propane gas pressure as delivered to the furnace and other RV appliances. An alarm setpoint output signal AL from said meter 44 is used to energize alarm 45, a visual indicator such as an LED, preferably located at the central panel. Said alarm output is generated by a low setpoint function when the signal P falls below a reference value corresponding to the minimum recommended gas pressure. A second high setpoint function can also be similarly used to energized a second alarm to indicate high gas pressure. In another means of carrying out the indication and alarm functions other than that shown by the preferred embodiment of the invention, the instrumentation amplifier can be replaced by an analog to digital (A/D) converter and its output used to drive a digital panel meter (DPM), such DPM's being commercially available with and without the alarm setpoint functions described above. Alternatively, the alarm setpoint functions described can be implemented by comparison to reference voltages and the alarm signal AL generated at the output of a comparator. These and other possible variations implementing the functionality described herein are properly considered to be within the scope and spirit of the claims to be presented.

Having described the invention in detail and by way of reference to preferred embodiments thereof, it will be apparent that other modifications and variations are possible without departing from the scope and spirit and spirit of the invention. Accordingly, it is to be understood that the invention is not to be limited by the specific illustrative embodiments, but only by the scope and spirit of the appended claims.

What is claimed is:

1. A heating furnace monitoring and thermostat cycling system for the cabin or interior living space of a recreational vehicle, marine vessel or other such mobile self-contained environment, said vehicle having a heating furnace provided with a thermostat circuit and a blower motor, the system comprising, in combination:
   a means for sensing the ambient temperature of said cabin;
   a means for detecting a decrease in said ambient temperature;
   a means for detecting the operation of said blower motor;
   a means for cycling open and then closed said thermostat circuit of said heating furnace when said decrease in ambient temperature and said operation of the furnace blower motor are detected simultaneously;
   a means for disabling furnace operation after a countably finite number of said cycling actions.

2. A system as in claim 1, further comprising:
   a means for displaying said ambient temperature;
   a means for counting the number of said cycling actions;
   a means for displaying the cumulative number of said cycling actions of said thermostat circuit;
   a means to reset the cumulation of the number of said cycling actions to zero and enable furnace operation.

3. A heating furnace monitoring and thermostat cycling system for the cabin or interior living space of a recreational vehicle, marine vessel or other such mobile self-contained environment, said vehicle having a heating furnace provided with a thermostat circuit and a blower motor, the system comprising, in combination:
   a means for generating a first signal responsive to the ambient temperature in said cabin;
   a means for generating a second signal responsive to the polarity of the differential with respect to time of said temperature;
   a means for generating a third signal when said second signal is of a polarity indicative of decreasing temperature;
   a means for generating a fourth signal responsive to the flow of electrical current to said blower motor;
   a means for generating a fifth signal when said third and fourth signals are generated simultaneously;
   a means for effecting an electrically open circuit of infinite resistance and subsequently an electrically closed circuit of zero resistance in the thermostat circuit of said heating furnace in response to the generation of said fifth signal;
   a means for counting the number of said responses;
   a means for storing a maximum reference value;
   a means a generating a sixth signal when said cumulative number exceeds said stored maximum reference value;
   a means for effecting an electrically open circuit of infinite resistance in said thermostat circuit in response to said generation of said sixth signal.

4. A system as in claim 3, further comprising:
   a means for indicating the generation of said fifth signal;
   a means of displaying said cumulative number of responses to said generation of said fifth signal;
   a means for indicating the generation of said sixth signal;
   a switching means to reset the value of said cumulative number to zero;
   a means for reversing the effecting of said open circuit in response to said generation of said sixth signal.

5. A system as in claim 3, further comprising:
   a circuit generating a digital logic signal in response to a level of voltage differential across a resistive network in electrical series with a power source and the furnace of said living space.

6. A system as in claim 5, further comprising;

an operational amplifier whose input is in electrical communication with said resistive network and whose output energizes the non-inverting input of a comparator, the inverting input of said comparator subjected to a suitable reference voltage, the output of said comparator saturating to a digital logic signal level when energized by said operational amplifier.

7. A system as in claim 3, further comprising:

a sensor and interfacing circuit generating said digital logic signal in response to the presence of a magnetic field associated with and indicative of the presence of electrical current flow to the blower motor of the heating furnace of said cabin.

8. A system as in claim 3, further comprising;

a means for generating a timed pulse signal in response to the generation of said fifth signal;

a circuit means for amplifying said pulsed signal;

a means for said amplified pulsed signal to electrically energize and subsequently de-energize the electromagnetic coil of a normally closed relay whose contacts are in electrical communication with the thermostat circuit presented to the heating furnace of said living space;

a circuit means for amplifying said sixth signal to electrically energize the electromagnetic coil of a normally closed relay whose contacts are in electrical communication with the thermostat circuit presented to the heating furnace of said living space.

* * * * *